(12) United States Patent
Bougaev et al.

(10) Patent No.: US 7,660,775 B2
(45) Date of Patent: Feb. 9, 2010

(54) METHOD AND APPARATUS FOR CLASSIFYING DATA USING R-FUNCTIONS

(75) Inventors: Anton A. Bougaev, Lafayette, IN (US);
Aleksey M. Urmanov, San Diego, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 857 days.

(21) Appl. No.: 11/387,253

(22) Filed: Mar. 22, 2006

(65) Prior Publication Data
US 2007/0244843 A1    Oct. 18, 2007

(51) Int. Cl.
G06E 1/00     (2006.01)
G06E 3/00     (2006.01)
G06F 15/18    (2006.01)
G06G 7/00     (2006.01)

(52) U.S. Cl. ........................................................ 706/20
(58) Field of Classification Search ................. 706/20
See application file for complete search history.

(56) References Cited

U.S. PATENT DOCUMENTS

| | | | |
|---|---|---|---|
| 7,035,841 B2 * | 4/2006 | Chidlovskii | 707/2 |
| 7,139,777 B2 * | 11/2006 | Chidlovskii | 707/104.1 |
| 7,440,951 B2 * | 10/2008 | Chidlovskii | 707/10 |
| 7,440,974 B2 * | 10/2008 | Chidlovskii | 707/104.1 |
| 7,478,075 B2 * | 1/2009 | Urmanov et al. | 706/25 |

OTHER PUBLICATIONS

On the algorithmic implementation of stochastic discrimination Kleinberg, E.M.; Pattern Analysis and Machine Intelligence, IEEE Transactions on vol. 22, Issue 5, May 2000 pp. 473-490 Digital Object Identifier 10.1109/34.857004.*
A Theoretical Analysis of Bagging as a Linear Combination of Classifiers Fumera, G.; Roli, F.; Serrau, A.; Pattern Analysis and Machine Intelligence, IEEE Transactions on vol. 30, Issue 7, Jul. 2008 pp. 1293-1299 Digital Object Identifier 10.1109/TPAMI.2008.30.*

* cited by examiner

*Primary Examiner*—Michael B Holmes
(74) *Attorney, Agent, or Firm*—Park, Vaughan & Fleming LLP (57) ABSTRACT

One embodiment of the present invention provides a system that constructs a classifier that distinguishes between different classes of data points. During operation, the system first receives a data set, which includes class-one data points and class-two data points. For each class-one data point in the data set, the system uses a separating primitive to produce a set of point-to-point separating boundaries, wherein each point-to-point separating boundary separates the class-one data point from a different class-two data point. Next, the system combines separating boundaries in the set of separating boundaries to produce a point-to-class separating boundary that separates the class-one data point from all of the class-two data points in the data set. Finally, the system combines the point-to-class separating boundaries for each of the class-one data points to produce a class-to-class separating boundary for the classifier that separates all of the class-one data points from all of the class-two data points in the data set.

28 Claims, 5 Drawing Sheets

METHOD AND APPARATUS FOR CLASSIFYING DATA USING R-FUNCTIONS

BACKGROUND

1. Field of the Invention

The present invention relates to techniques for automatically classifying data. More specifically, the present invention relates to a method and apparatus that automatically separates different classes of data patterns in a data set by constructing data classifiers using R-functions.

2. Related Art

Many data-classification applications, such as system fault-identification applications and network attack detection applications, operate by dividing input data into more readily processable subsets. More specifically, such data processing applications typically employ classification-type pattern recognition mechanisms to divide the available data into two (and sometimes more) subsets.

One technique for input data classification utilizes "nearest neighbor classifiers," which require storing all training patterns and their class labels in a dictionary. New patterns being processed are given the class labels of the most-similar stored patterns. This technique requires few computational resources during training phase of the data classification. However, this technique requires significantly more computational resources during the retrieval phase of the data classification. Furthermore, nearest-neighbor classifiers provide no analytical representation of the class separating boundary. Note that such analytical representations are extremely desirable in many applications.

The "Bayes classifier" technique uses the Bayes likelihood ratio test to decide whether a given pattern belongs to a given class in two-class problems. However, this technique typically requires knowledge of the conditional probability density functions for each class, which must be estimated using a finite number of training patterns. Unfortunately, these estimation procedures can be extremely complex and may require a large number of training patterns to obtain accurate results, thereby consuming a significant amount of computational time and storage resources.

Another pattern-classification mechanism, known as an "artificial neural network" (ANN), requires a significant amount of training (on input training data) to allow the trained networks to perform classification on actual data within a predetermined error-tolerance. Unfortunately, ANNs are known to have a series of problems, including: (1) long training time; (2) tendency of data-overfitting; and (3) exhibiting inconsistent results which are partially caused by stochastic optimization of the weights and difficulties associated with implementing regularization procedures.

The "support vector machine" (SVM) pattern classification technique uses a set of patterns, represented by vectors in n-dimensional space as input data, and classifies these input patterns with nonlinear decision surfaces. During pattern classification, the input patterns first undergo a nonlinear transformation to a new, so-called "feature space", using a convolution of dot-products for linear separation by a set of hyperplanes (n-dimensional surface separating classes of data) in the transformed space. Next, the SVM determines an optimal hyperplane from the set of hyperplanes that separate the classes. Unfortunately, the training phase of the SVM requires significant computational resources due to the complexity in computing the numerical solution of the quadratic programming optimization problem associated with finding the weighting parameters. This limits the ability of applying the SVM technique on large tasks. Furthermore, the SVM-based classifiers have no pattern rejection option which is desirable in many applications in situations where patterns not similar to either class need to be rejected.

In summary, the above techniques and other ad-hoc techniques all suffer from one of the following deficiencies: (1) prohibitively long training and retrieval phases; (2) lack of analytical representation of the class separation boundary; (3) inconsistencies in results due to either numerical or stochastic optimization of weights; (4) overwhelming complexity of parameter estimating procedures requiring a large number of patterns to achieve accurate results; and (5) the impossibility to implement weak and strong rejection options for rejecting patterns not similar to either class.

Hence, what is needed is a method and an apparatus for automatically classifying input data patterns into separate classes without the above-described problems.

SUMMARY

One embodiment of the present invention provides a system that constructs a classifier that distinguishes between different classes of data points. During operation, the system first receives a data set, which includes class-one data points and class-two data points. For each class-one data point in the data set, the system uses a separating primitive to produce a set of point-to-point separating boundaries, wherein each point-to-point separating boundary separates the class-one data point from a different class-two data point. Next, the system combines separating boundaries in the set of separating boundaries to produce a point-to-class separating boundary that separates the class-one data point from all of the class-two data points in the data set. Finally, the system combines the point-to-class separating boundaries for each of the class-one data points to produce a class-to-class separating boundary for the classifier that separates all of the class-one data points from all of the class-two data points in the data set.

In a variation on this embodiment, the separating primitive is a real-valued function $\rho(x; u, v)$ that comprises a vector-variable x, and two vector-parameters u and v, such that $\rho(x; u, v)$ divides an n-dimensional space into two subspaces, wherein the first subspace contains point u, and the second subspace contains point v. Note that $\rho(x; u, v) > 0$ for all x in the first subspace containing u; $\rho(x; u, v) < 0$ for all x in the second subspace containing v; and $\rho(x; u, v) = 0$ for all x defining the point-to-point separating boundary that separates u and v.

In a further variation on this embodiment, the separating primitive function $\rho(x; u, v)$ can include: (1) a linear separating primitive function; (2) a spherical separating primitive function; (3) a parabolic separating primitive function; (4) a hyperbolic separating primitive function; and (5) an elliptic separating primitive function.

In a variation on this embodiment, the system combines the set of point-to-point separating boundaries to produce the point-to-class separating boundary by: (1) computing the intersection of a set of subspaces defined by the set of point-to-point separating boundaries, wherein each subspace in the set of subspaces contains the class-one data point; and (2) constructing the point-to-class separating boundary from the boundary of the intersection.

In a further variation on this embodiment, the system computes the intersection of the set of subspaces and constructs the point-to-class separating boundary by using R-functions, wherein an R-function is a function whose sign can change if and only if the sign of one of its arguments changes.

In a further variation on this embodiment, the system produces the point-to-class separating boundary by using the R-function to perform a logical conjunction operation on the set of point-to-point separating boundaries to produce the point-to-class separating boundary.

In a variation on this embodiment, the system combines the point-to-class separating boundaries for each of the class-one data points to produce the class-to-class separating boundary by: (1) computing the union of a set of subspaces defined by the point-to-class separating boundaries, wherein each subspace in the set of subspaces contains at least one class-one data point; and (2) constructing the class-to-class separating boundary from the boundary of the union.

In a further variation on this embodiment, the system produces the class-to-class separating boundary by using an R-function to perform a logical disjunction operation on the set of point-to-class separating boundaries to produce the class-to-class separating boundary.

In a variation on this embodiment, the class-to-class separating boundary is defined in an n-dimensional space by an equation $R(x)=0$, wherein x is an n-dimensional vector-variable. Note that $R(x^{(1)}) > 0$ for all class-one data points $x^{(1)}$ in the data set; and $R(x^{(2)}) < 0$ for all class-two data points $x^{(2)}$ in the data set.

In a variation on this embodiment, function $R(x)$ is generated by the R-function, wherein $R(x)$ has an analytical representation and is continuously differentiable.

BRIEF DESCRIPTION OF THE FIGURES

Table 1 presents a list of separating primitives in accordance with an embodiment of the present invention.

Table 2 presents a list of R-cloud classifier decision making options in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Pattern Recognition and Pattern Classification

Pattern recognition is a commonly performed task in engineering systems. The problem of pattern recognition is to assign (or classify) objects into categories. Typically, similar objects fall into the same category. However, it is not uncommon that objects in the same category may vary widely, while objects in different categories may be very similar. The problem of two-class pattern recognition classifies input patterns into only two categories (or classes). A typical example of a two-class pattern recognition problem is to distinguish between good and faulty components for fault-detection and isolation (FDI) applications. Another example is to distinguish between normal and runaway states of software processes using various software metrics in software aging and rejuvenation.

Let $X=\{X_1, X_2, \ldots, X_n\}$ be the set of features or parameters describing objects as n-dimensional vectors $x=[x_1, x_2, \ldots, x_n]^T$ in $R^n$, and let $D=\{x_1, x_2, \ldots, x_n\}$, where $x_j=[x_{1j}, x_{2j}, \ldots, x_{nj}]^T$ in $R^n$, be the design data set of input data points. Each data point in the design data set has a class label associated with it, for example, $x_j^{(C)}=[x_{1j}^{(C)}, x_{2j}^{(C)}, \ldots, x_{nj}^{(C)}]^T$, where $C \in \{1, 2\}$ is a class label for two classes. When class labels are unknown in the design set, the problem becomes an unsupervised pattern recognition problem and is dealt with by using clustering techniques.

In one embodiment of the present invention, the class labels are known for the design data set. In this embodiment, a decision function based on the design (training) data set is found which distinguishes representatives of one class from the representatives of the other class. The computed decision function is then used to classify previously unseen patterns. Note that the process of automated labeling of previously unseen patterns is referred to as pattern classification.

R-Function-Based Representation of Geometrical Objects

A real-valued function $f(x_1, x_2, \ldots, x_n)$ whose sign is completely determined by the signs of its arguments $x_i$ (i.e. the function changes its sign only when its arguments change their signs) is called an R-function. The sign of an R-function can be considered as a logical property. Negative values can be interpreted as a logical false, and positive values can be interpreted as a logical true. R-functions can be evaluated, can be differentiated, and have other useful properties. One application of R-functions is to represent geometrical objects in Euclidean space $R^n$, which is a generalization of 2-dimensional and 3-dimensional-spaces for a coordinate system with n dimensions. R-functions can represent any geometrical object S in $R^n$ by equation $f(x)=0$ and inequality $f(x) \geq 0$, wherein $f(x)$ is a specified number-of-times continuously differentiable function that satisfies $f(x)=0$ and $f(x) \geq 0$ only for the points belonging to S. Note that $f(x)$ is written as a single analytical expression. The set of points in Euclidean space $R^n$ in which function $f(x)$, where $x=(x_1, x_2, \ldots, x_n)$, equals zero is called the boundary of the geometrical object described by equation $f(x)=0$. The set of all points in $R^n$ in which $f(x)$ is non-negative is called the region described by inequality $f(x) \geq 0$.

Separating Primitives and Point-to-Point Separating Boundary

ρ(x; u, v) is a separating primitive, which is a real-valued function of one vector-variable x∈$R^n$, and two vector-parameters u∈$R^n$ and v∈$R^n$. All x, u, and v are points in n-dimensional space $R^n$. A separating primitive divides the n-dimensional space $R^n$ into two subspaces or regions, one containing point u and the other containing point v. Thus, the separating primitive, defined on two points u and v, separates these two points. Generally, a separating primitive can be regarded as a decision boundary for a pair of points from two classes. Note that ρ(x; u, v)>0 for all x in the subspace containing u, and ρ(x; u, v)<0 for all x in the subspace containing v. Points x in which ρ(x; u, v)=0 define a point-to-point separating boundary that separates u and v.

Figure 1:
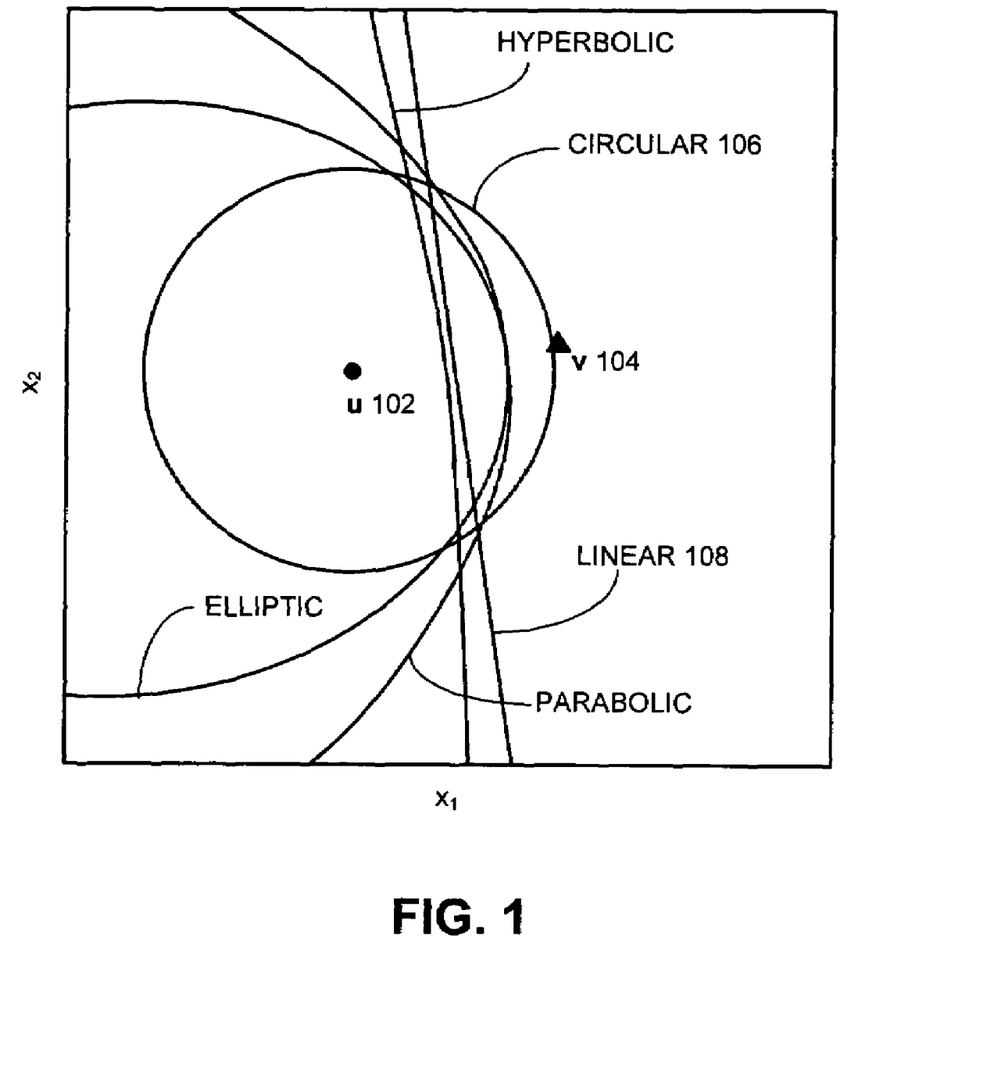
FIG. 1 illustrates some typically two-dimensional separating primitives in accordance with an embodiment of the present invention.

There are many choices for separating primitives. FIG. 1 illustrates some typically two-dimensional separating primitives in accordance with an embodiment of the present invention. In FIG. 1, the small filled circle 102 is denoted as point u=$[u_1, \ldots, u_n]^T$, which is a class-one data point, and the filled triangle 104 is denoted as point v=$[v_1, \ldots, v_n]^T$, which is a class-two data point. The equations defining these separating primitives for the general n-dimensional case are listed in Table 1. Note that an n-dimensional spherical primitive becomes a circle 106, and an n-dimensional linear primitive becomes a straight line 108 in the two-dimensional space as illustrated in FIG. 1. In Table 1, d(u, v) denotes the Euclidian distance between points u and v in the n-dimensional space $R^n$, wherein points u and v are separated by a multidimensional separating primitive given by the equation ρ(x; u, v)=0.

Point-to-Class Separating Boundary

Figure 2A:
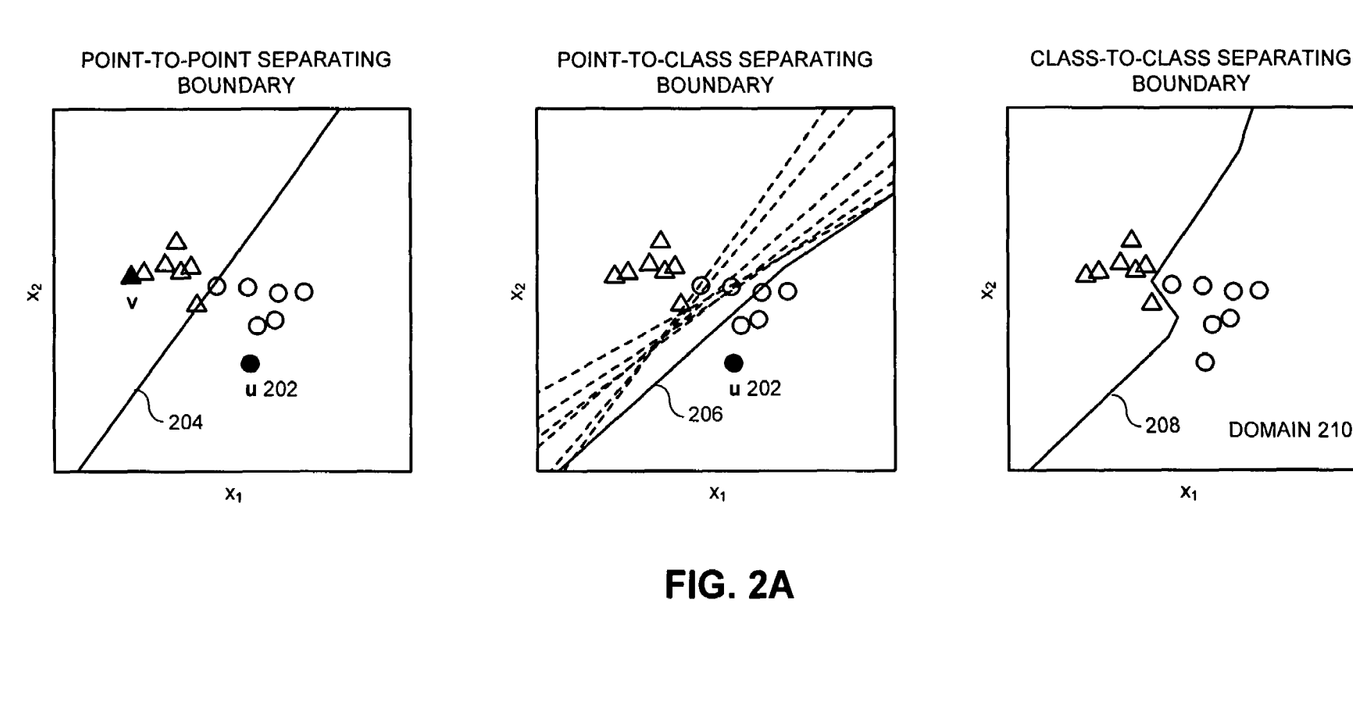
FIG. 2A illustrates the process of constructing a data classifier using a linear separating primitive in accordance with an embodiment of the present invention.
Figure 2B:
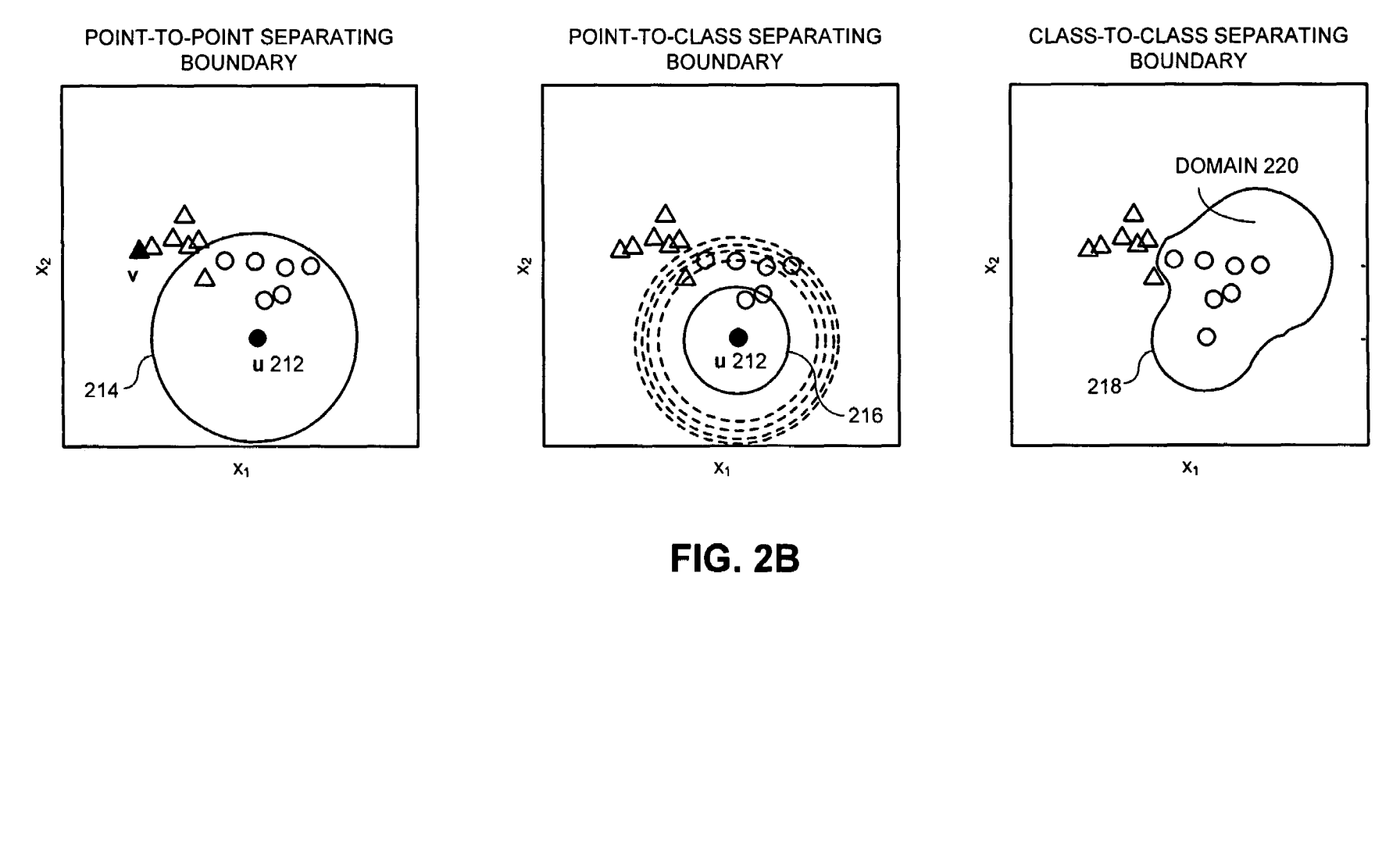
FIG. 2B illustrates the process of constructing a data classifier using a circular separating primitive in accordance with an embodiment of the present invention.

A point-to-class separating boundary separates a single point of class-one from all the points of class-two. FIG. 2A illustrates the process of constructing a data classifier using a linear separating primitive in accordance with an embodiment of the present invention. Similarly, FIG. 2B illustrates the process of constructing a data classifier using a circular separating primitive in accordance with an embodiment of the present invention. Note that the class-one and class-two data points are represented by circles and triangles respectively.

Consider one of the class-one data points which is denoted as u. This point is shown as a filled circle 202 in the middle plot in FIG. 2A in the case of the linear separating primitive, and a filled circle 212 in the middle plot in FIG. 2B in the case of the circular separating primitive. Taking each of the class-two data points in the set $x_j^{(2)}$, j=1 ... $k^{(2)}$, shown as triangles in FIGS. 2A and 2B, and constructing a separating primitive ρ(•; u, $x_j^{(2)}$) for each pair of {u, $x_j^{(2)}$}, we obtain $k^{(2)}$ point-to-point separating boundaries (shown as dashed lines in the middle plots in FIGS. 2A and 2B), wherein each of the point-to-point separating boundaries separates u from the corresponding $x_j^{(2)}$. Note that a point-to-point separating boundary defined by separating primitive ρ(•; u, $x_j^{(2)}$) separates u from $x_i^{(2)}$ but may or may not separate u from some other class-two data points (i.e., $x_i^{(2)}$, where i≠j). For example, a linear separating boundary 204 and a circular separating boundary 214 are shown as a solid line and a solid circle in the leftmost plots in FIGS. 2A and 2B, respectively. Note that separating boundaries 204 and 214 separate class-one data point u from class-two data point v, respectively.

All $k^{(2)}$ point-to-point separating boundaries are then combined in a manner that the resulting separating boundary separates u from all the points of class-two, which is referred to as a point-to-class separating boundary. Such a point-to-class separating boundary is realized as the intersection or conjunction of the areas formed by all $k^{(2)}$ equations ρ(•; u, $x_j^{(2)}$)>0, i.e., all the areas that include u. This point-to-class separating boundary is shown in the middle plot in FIG. 2A as solid curved line 206 and in the middle plot in FIG. 2B as solid circle 216. In one embodiment of the present invention, the intersection of the areas is obtained by using the R-function. Note that the R-function operation on these areas mimics the logical conjunction of sets, which is be referred to as R-conjunction for simplicity. Mathematically, the point-to-class separating boundary is expressed as:

$$b^{(1)}(\bullet; u) = \bigwedge_j \rho(\bullet; u, x_j^{(2)}), j=1 \ldots k^{(2)}, \quad (Eq. 1)$$

wherein the symbol ∧ denotes the R-conjunction operation.

Class-to-Class Separating Boundary (Classifier)

By constructing point-to-class separating boundaries for each point in class-one, $x_i^{(1)}$, i=1 ... $l^{(1)}$, and combining all $l^{(1)}$ separating boundaries, a class-to-class separating boundary is generated which separates all class-one data points from all class-two data points in the design data set D={$x_i^{(1)}$, $x_j^{(2)}$}. This class-to-class separating boundary is shown as solid curved lines 208 and 218 in the rightmost plots in FIGS. 2A and 2B, respectively. Note that class-to-class separating boundaries 208 and 218 divide each of the 2-dimensional spaces into two domains, wherein domains 210 and 220 contains exclusively class-one data points. We refer to these domains associated with the class-one data point as R-clouds for simplicity.

In one embodiment of the present invention, an R-cloud that represents a multi-dimensional classification domain of the class-one data point is obtained using the R-function. Note that each of the point-to-class separating boundaries $b^{(1)}(\bullet; x_i^{(1)})$, i=1 ... $l^{(1)}$ divides a multi-dimensional space into two subspaces, wherein one of the subspaces is a class-one subspace. The R-function performs a logical disjunction operation on all the class-one subspaces which are defined by an inequality expression $b^{(1)}(\bullet; x_i^{(1)}) \geq 0$, i=1 ... $l^{(1)}$. The R-function operation on these subspaces is referred to as an R-conjunction for simplicity.

Note that there are two symmetric class-to-class separating boundary construction processes, one for class-one data points and one for class-two data points. Mathematically, the two processes using R-function can be expressed as:

$$R^{(1)}(\bullet) = \bigvee_i b^{(1)}(\bullet; x_i^{(1)}) = \bigvee_i \bigwedge_j \rho(\bullet; x_i^{(1)}, x_j^{(2)}), \text{ and} \quad (Eq. 2a)$$

$$R^{(2)}(\bullet) = \bigvee_j b^{(2)}(\bullet; x_j^{(2)}) = \bigvee_j \bigwedge_i \rho(\bullet; x_j^{(2)}, x_i^{(1)}), \quad (Eq. 2b)$$

for i=1 ... $l^{(1)}$, j=1 ... $k^{(2)}$, wherein the symbol ∨ denotes the R-disjunction operation, and the symbol ∧ denotes the R-conjunction operation. The main feature of the resultant analytical representations $R^{(1)}(\bullet)$ and $R^{(2)}(\bullet)$ is that $R^{(1)}(x_i^{(1)}) > 0$ for all points belonging to class-one in the design data set, and $R^{(2)}(x_j^{(2)}) > 0$ for all the points belonging to class-two in the design set. $R^{(1)}(\bullet) > 0$ and $R^{(2)}(\bullet) > 0$ then define two spaces in which data points contain within the spaces will be classified as class-one and class-two data points, respectively.

Process of Constructing the Classifier

Figure 3A:
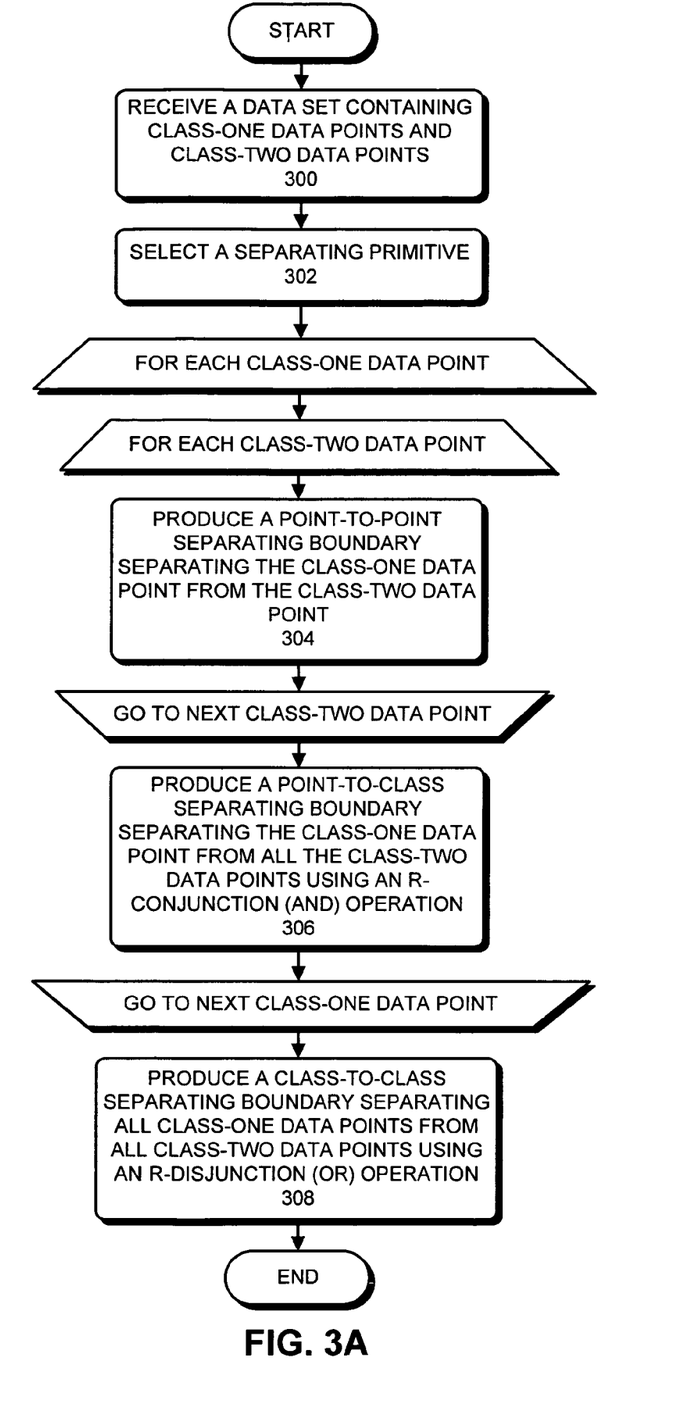
FIG. 3A presents a flowchart illustrating the process of constructing a classifier that distinguishes between the class-one and class-two data points in accordance with an embodiment of the present invention.

FIG. 3A presents a flowchart illustrating the process of constructing a classifier that distinguishes between the class-one and class-two data points in accordance with an embodiment of the present invention.

The process begins with receiving an input data set, which includes class-one data points and class-two data points (step 300). In one embodiment of the present invention, data points in the input data set are registered and normalized prior to the reception of the data set. Also note that each data points in the input data set have been labeled as either class-one or class-two.

The process then selects one of the commonly used separating primitives, for example, from the list in Table 1 (step 302).

Next, for a class-one data point in the data set, the process recursively chooses each of the class-two data points, and uses the selected separating primitive to produce a set of point-to-point separating boundaries, such that each of the point-to-point separating boundary separates the class-one data point from a different class-two data point (step 304).

The process next combines the set of point-to-point separating boundaries from step 304 to produce a point-to-class separating boundary that separates the class-one data point from all of the class-two data points in the data set (step 306).

Figure 3B:
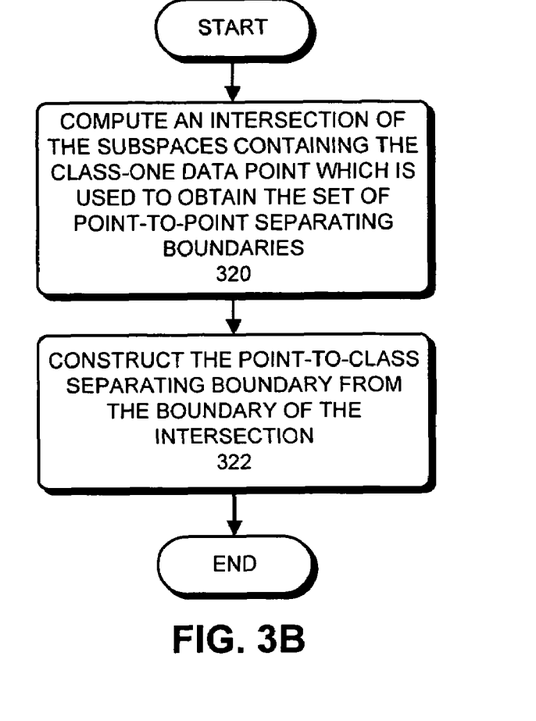
FIG. 3B presents a flowchart illustrating the process of producing a point-to-class separating boundary in accordance with an embodiment of the present invention.

FIG. 3B presents a flowchart illustrating the process of producing a point-to-class separating boundary in accordance with an embodiment of the present invention. Specifically, the process first computes the intersection of a set of subspaces defined by the set of point-to-point separating boundaries, wherein each subspace in the set of subspaces contains the class-one data point (step 320). Mathematically, each subspace in the set of subspaces satisfied the inequality $\rho(x; u, v) > 0$ for all point x in the subspace containing the class-one data point u, wherein $\rho(x; u, v)$ is the selected separating primitive, and v is a class-two data point.

Note that the process computes the intersection of the subspaces using an R-function, wherein the R-function performs a logical conjunction (AND) operation on the set of point-to-point separating boundaries to produce the point-to-class separating boundary. Next, the process constructs the point-to-class separating boundary from the boundary of the intersection of the set of subspaces (step 322).

Referring back to FIG. 3A, the process repeats steps 304 and 306 for all class-one data points and produces a set of point-to-class separating boundaries for each of the class-one data points.

Finally, the process combines the set of point-to-class separating boundaries to produce a class-to-class separating boundary, i.e., the classifier that separates all of the class-one data points from all of the class-two data points in the data set (step 308).

Figure 3C:
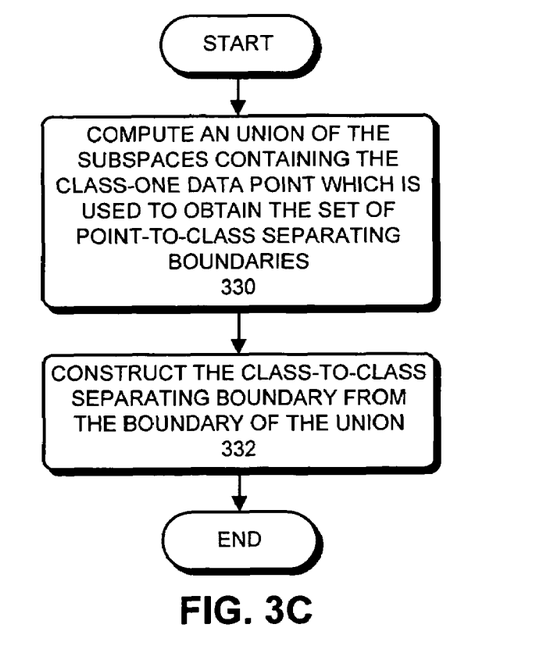
FIG. 3C presents a flowchart illustrating the process of producing a class-to-class separating boundary in accordance with an embodiment of the present invention.

FIG. 3C presents a flowchart illustrating the process of producing a class-to-class separating boundary in accordance with an embodiment of the present invention. Specifically, the process first computes the union of a set of subspaces defined by the point-to-class separating boundaries, wherein each subspace in the set of subspaces contains a selected class-one data point (step 330).

Note that the process computes the union of the set of subspaces using an R-function, wherein the R-function performs a logical disjunction (OR) operation on the set of point-to-class separating boundaries to produce the class-to-class separating boundary. Next, the process constructs the class-to-class separating boundary from the boundary of the union of the set of subspaces (step 332).

Mathematically, the class-to-class separating boundary is defined in an n-dimensional space by an equation $R(x)=0$, wherein x is an n-dimensional vector-variable, and $R(x)$ is defined in [Eq. 1]. Note that $R(x^{(1)}) > 0$ for all class-one data points $x^{(1)}$ in the data set, while $R(x^{(2)}) < 0$ for all class-two data points $x^{(2)}$ in the data set.

Using the Classifier for Pattern Classification

In one embodiment of the present invention, the data points used for constructing the class-to-class classifier can be considered as a group of training patterns for a pattern classification system. When the class-to-class classifier is constructed from these train patterns, it can be used to classify new, previously unseen patterns. As these new, previously unseen patterns represented by vector-variable $x \in R^N$ become available, the following procedure is performed to assign proper class labels to these new patterns. Specifically, if a new pattern x is inside R-cloud $R^{(1)}$ (i.e. $R^{(1)}(x) > 0$) and is outside of R-cloud $R^{(2)}$ (i.e., $R^{(2)}(x) < 0$), then x is labeled as a class-one data pattern (i.e. x belongs to class-one). If x is outside of $R^{(1)}$ (i.e. $R^{(1)}(x) < 0$), and inside of $R^{(2)}$ (i.e., $R^{(2)}(x) > 0$), then x is labeled as a class-two data pattern.

Note that there are two more possibilities. One is a situation where x is inside both R-clouds ($R^{(1)}(x) > 0$ and $R^{(2)}(x) > 0$), which can occur only when there is an overlap between the two R-clouds $R^{(1)}$ and $R^{(2)}$. In this case, no label can be assigned to new pattern x and it should be rejected (i.e., weak rejection). Such situations occur when the underlying class-generating distributions naturally overlap. For applications which rejection is undesirable, a classification decision can be made by computing the distances from data point x to the boundaries of each of the two overlapping R-clouds, and assigning the label of the R-cloud for which the computed distance is larger. The rationale behind this rule for overlapping R-clouds is that x is deeper inside the R-cloud in which the distance from x to the boundary of that R-cloud is the larger one.

The other possibility is a situation where a new data pattern x is outside of both R-clouds ($R^{(1)}(x) < 0$ and $R^{(2)}(x) < 0$), i.e. x does not belong to either of the two classes. In such a case, the data pattern is also rejected because the pattern is not close to either class (i.e., strong rejection). All four pattern classification situations described above are summarized in Table 2.

TABLE 1

Separating Primitives

| | |
|---|---|
| Linear | $\rho_l(x; u, v, \alpha) = n^T((v + u)/2 - \alpha n - x)$, $n = (u - v)/\|u - v\|$ |
| Spherical | $\rho_s(x; u, v, \alpha) = \alpha d(v, u) - d(u, x)$ |
| Parabolic | $\rho_p(x; u, v, \alpha) = d^l(u, v)(v - u)^T(\alpha u + (1 - \alpha)v - x) - d(x, u)$ |
| Hyperbolic | $\rho_h(x; u, v, \alpha) = d(x, u) - d(x, v) - \alpha d(u, v)$ |
| Elliptic | $\rho_e(x; u, v, (\alpha, \beta)) = (1 - \alpha)d(u, v) + d(u, u - \beta(v - u)) - d(x, u) - d(x, u - \beta(v - u))$ |

TABLE 2

The R-Cloud Classifier Decision Making Options

| $R_1(x)$ | $R_2(x)$ | Decision |
|---|---|---|
| >0 | ≤0 | Class 1 |
| ≤0 | >0 | Class 2 |
| ≥0 | ≥0 | Weak rejection |
| ≤0 | ≤0 | Strong rejection |

CONCLUSION

The above-described R-function-based pattern recognition and pattern classification technique provides a unique machine-learning process to distinguish the patterns of one class from the patterns of the other class. The technique has the following properties: (1) it takes advantage of the R-function-based representation of the class separation boundary which is specified-number-of-times continuously differentiable and represented as a single analytical expression; (2) it requires very little computational resources during a training phase because it does not use numerical optimization, stochastic optimization nor complex parameter estimation algorithms; and (3) it allows for designing pattern classifiers with weak and strong rejection options for rejecting patterns not similar to either class, which is desirable for many engineering applications.

Furthermore, the above-described pattern recognition and pattern classification technique allows fast construction of an automatic classification system on a computer based on a set of training patterns for both of the following cases: (1) having a limited number of training patterns when monitoring an individual system or component; and (2) having a very large number of training patterns when mining telemetry data bases containing information about hundreds to thousands of servers, for the recognition of very subtle failure precursors such as aging processes, degrading sensors, delamination of bonded components, solder-joint cracking, deterioration of MPI socket connectors, and other failure mechanisms.

Note that although for purpose of explanation we focused on a two-class pattern classification process, it should be apparent to one of ordinary skill in the art that the general technique can be extended to multi-class pattern classification.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for constructing a classifier that distinguishes between different classes of data points, comprising:
  receiving a data set, which includes class-one data points and class-two data points;
  for each class-one data point in the data set,
    using a separating primitive to produce a set of point-to-point separating boundaries, wherein each point-to-point separating boundary separates the class-one data point from a different class-two data point; and
    combining separating boundaries in the set of separating boundaries to produce a point-to-class separating boundary that separates the class-one data point from all of the class-two data points in the data set; and
  combining the point-to-class separating boundaries for each of the class-one data points to produce a class-to-class separating boundary for the classifier that separates all of the class-one data points from all of the class-two data points in the data set.

2. The method of claim 1, wherein the separating primitive is a real-valued function $\rho(x; u, v)$ that comprises a vector-variable x, and two vector-parameters u and v, such that $\rho(x; u, v)$ divides an n-dimensional space into two subspaces, wherein the first subspace contains point u, and the second subspace contains point v, and wherein,
  $\rho(x; u, v)>0$ for all x in the first subspace containing u;
  $\rho(x; u, v)<0$ for all x in the second subspace containing v; and
  $\rho(x; u, v)=0$ for all x defining the point-to-point separating boundary that separates u and v.

3. The method of claim 2, wherein the separating primitive function $\rho(x; u, v)$ can include:
  a linear separating primitive function;
  a spherical separating primitive function;
  a parabolic separating primitive function;
  a hyperbolic separating primitive function; or
  an elliptic separating primitive function.

4. The method of claim 1, wherein combining the set of point-to-point separating boundaries to produce the point-to-class separating boundary involves:
  computing the intersection of a set of subspaces defined by the set of point-to-point separating boundaries, wherein each subspace in the set of subspaces contains the class-one data point; and
  constructing the point-to-class separating boundary from the boundary of the intersection.

5. The method of claim 4, wherein computing the intersection of the set of subspaces and constructing the point-to-class separating boundary involves using R-functions, wherein an R-function is a function whose sign can change if and only if the sign of one of its arguments changes.

6. The method of claim 5, wherein producing the point-to-class separating boundary involves using the R-function to perform a logical conjunction operation on the set of point-to-point separating boundaries to produce the point-to-class separating boundary.

7. The method of claim 1, wherein combining the point-to-class separating boundaries for each of the class-one data points to produce the class-to-class separating boundary involves:
  computing the union of a set of subspaces defined by the point-to-class separating boundaries, wherein each subspace in the set of subspaces contains at least one class-one data point; and
  constructing the class-to-class separating boundary from the boundary of the union.

8. The method of claim 7, wherein producing the class-to-class separating boundary involves using an R-function to perform a logical disjunction operation on the set of point-to-class separating boundaries to produce the class-to-class separating boundary.

9. The method of claim 1, wherein the class-to-class separating boundary is defined in an n-dimensional space by an equation $R(x)=0$, wherein x is an n-dimensional vector-variable, and
  wherein $R(x^{(1)})>0$ for all class-one data points $x^{(1)}$ in the data set; and
  wherein $R(x^{(2)})<0$ for all class-two data points $x^{(2)}$ in the data set.

10. The method of claim 9, wherein function $R(x)$ is generated by the R-function, wherein $R(x)$ has an analytical representation and is continuously differentiable.

11. A computer-readable storage medium storing instructions that when executed by a computer cause the computer to perform a method for constructing a classifier that distinguishes between different classes of data points, the method comprising:
  receiving a data set, which includes class-one data points and class-two data points;
  for each class-one data point in the data set,
    using a separating primitive to produce a set of point-to-point separating boundaries, wherein each point-to-point separating boundary separates the class-one data point from a different class-two data point; and
    combining separating boundaries in the set of separating boundaries to produce a point-to-class separating boundary that separates the class-one data point from all of the class-two data points in the data set; and
  combining the point-to-class separating boundaries for each of the class-one data points to produce a class-to-class separating boundary for the classifier that separates all of the class-one data points from all of the class-two data points in the data set.

12. The computer-readable storage medium of claim 11, wherein the separating primitive is a real-valued function $\rho(x; u, v)$ that comprises a vector-variable x, and two vector-parameters u and v, such that $\rho(x; u, v)$ divides an n-dimensional space into two subspaces, wherein the first subspace contains point u, and the second subspace contains point v, and wherein, $\rho(x; u, v) > 0$ for all x in the first subspace containing u;

$\rho(x; u, v) < 0$ for all x in the second subspace containing v; and $\rho(x; u, v) = 0$ for all x defining the point-to-point separating boundary that separates u and v.

13. The computer-readable storage medium of claim 12, wherein the separating primitive function $\rho(x; u, v)$ can include:

a linear separating primitive function;

a spherical separating primitive function;

a parabolic separating primitive function;

a hyperbolic separating primitive function; or an elliptic separating primitive function.

14. The computer-readable storage medium of claim 11, wherein combining the set of point-to-point separating boundaries to produce the point-to-class separating boundary involves:

computing the intersection of a set of subspaces defined by the set of point-to-point separating boundaries, wherein each subspace in the set of subspaces contains the class-one data point; and constructing the point-to-class separating boundary from the boundary of the intersection.

15. The computer-readable storage medium of claim 14, wherein computing the intersection of the set of subspaces and constructing the point-to-class separating boundary involves using R-functions, wherein an R-function is a function whose sign can change if and only if the sign of one of its arguments changes.

16. The computer-readable storage medium of claim 15, wherein producing the point-to-class separating boundary involves using the R-function to perform a logical conjunction operation on the set of point-to-point separating boundaries to produce the point-to-class separating boundary.

17. The computer-readable storage medium of claim 11, wherein combining the point-to-class separating boundaries for each of the class-one data points to produce the class-to-class separating boundary involves:

computing the union of a set of subspaces defined by the point-to-class separating boundaries, wherein each subspace in the set of subspaces contains at least one class-one data point; and constructing the class-to-class separating boundary from the boundary of the union.

18. The computer-readable storage medium of claim 17, wherein producing the class-to-class separating boundary involves using an R-function to perform a logical disjunction operation on the set of point-to-class separating boundaries to produce the class-to-class separating boundary.

19. The computer-readable storage medium of claim 11, wherein the class-to-class separating boundary is defined in an n-dimensional space by an equation $R(x)=0$, wherein x is an n-dimensional vector-variable, and wherein $R(x^{(1)}) > 0$ for all class-one data points $x^{(1)}$ in the data set; and wherein $R(x^{(2)}) < 0$ for all class-two data points $x^{(2)}$ in the data set.

20. The computer-readable storage medium of claim 19, wherein function $R(x)$ is generated by the R-function, wherein $R(x)$ has an analytical representation and is continuously differentiable.

21. An apparatus that constructs a classifier that distinguishes between different classes of data points, comprising:

a receiving mechanism configured to receive a data set, which includes class-one data points and class-two data points;

a point-to-class separating boundary mechanism, wherein for each data pattern in the training data set the mechanism is configured to:

use a separating primitive to produce a set of point-to-point separating boundaries, wherein each point-to-point separating boundary separates the class-one data point from a different class-two data point; and to combine separating boundaries in the set of separating boundaries to produce a point-to-class separating boundary that separates the class-one data point from all of the class-two data points in the data set; and a class-to-class separating boundary mechanism configured to combine the point-to-class separating boundaries for each of the class-one data points to produce a class-to-class separating boundary for the classifier that separates all of the class-one data points from all of the class-two data points in the data set.

22. The apparatus of claim 21, wherein the separating primitive is a real-valued function $\rho(x; u, v)$ that comprises a vector-variable x, and two vector-parameters u and v, such that $\rho(x; u, v)$ divides an n-dimensional space into two subspaces, wherein the first subspace contains point u, and the second subspace contains point v, and wherein, $\rho(x; u, v) > 0$ for all x in the first subspace containing u;

$\rho(x; u, v) < 0$ for all x in the second subspace containing v; and $\rho(x; u, v) = 0$ for all x defining the point-to-point separating boundary that separates u and v.

23. The apparatus of claim 22, wherein the separating primitive function $\rho(x; u, v)$ can include:

a linear separating primitive function;

a spherical separating primitive function;

a parabolic separating primitive function;

a hyperbolic separating primitive function; or an elliptic separating primitive function.

24. The apparatus of claim 21, wherein while combining the set of point-to-point separating boundaries, the point-to-class separating boundary mechanism is configured to:

compute the intersection of a set of subspaces defined by the set of point-to-point separating boundaries, wherein each subspace in the set of subspaces contains the class-one data point; and to construct the point-to-class separating boundary from the boundary of the intersection.

25. The apparatus of claim 24, wherein computing the intersection of the set of subspaces and constructing the point-to-class separating boundary involves using R-functions, wherein an R-function is a function whose sign can change if and only if the sign of one of its arguments changes.

26. The apparatus of claim 25, wherein the point-to-class separating boundary mechanism is further configured to use the R-function to perform a logical conjunction operation on the set of point-to-point separating boundaries to produce the point-to-class separating boundary.

27. The apparatus of claim 21, wherein while combining the point-to-class separating boundaries for each of the class-one data points, the class-to-class separating boundary mechanism is configured to:

compute the union of a set of subspaces defined by the point-to-class separating boundaries, wherein each subspace in the set of subspaces contains at least one class-one data point; and to construct the class-to-class separating boundary from the boundary of the union.

28. The apparatus of claim 27, wherein the class-to-class separating boundary mechanism is further configured to use an R-function to perform a logical disjunction operation on the set of point-to-class separating boundaries to produce the class-to-class separating boundary.

* * * * *

UNITED STATES PATENT AND TRADEMARK OFFICE
CERTIFICATE OF CORRECTION

PATENT NO. : 7,660,775 B2 Page 1 of 1
APPLICATION NO. : 11/387253
DATED : February 9, 2010
INVENTOR(S) : Bougaev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 994 days.

Signed and Sealed this

Thirtieth Day of November, 2010

David J. Kappos
*Director of the United States Patent and Trademark Office*